United States Patent
Patterson, Jr. et al.

(10) Patent No.: US 7,442,453 B1
(45) Date of Patent: Oct. 28, 2008

(54) DECONTAMINATION PROCEDURE FOR A FUEL CELL POWER PLANT

(75) Inventors: Timothy W. Patterson, Jr., East Hartford, CT (US); Michael L. Perry, South Glastonbury, CT (US); Tommy Skiba, East Hartford, CT (US); Ping Yu, West Hartford, CT (US); Thomas D. Jarvi, Manchester, CT (US); James A. Leistra, Penfield, NY (US); Hiroshi Chizawa, Yokohama (JP); Tsutomu Aoki, Kawasaki (JP)

(73) Assignee: UTC Fuel Cells, LLC, South Windsor, CT (US)

( * ) Notice: Subject to any disclaimer, the term of this patent is extended or adjusted under 35 U.S.C. 154(b) by 661 days.

(21) Appl. No.: 11/023,148

(22) Filed: Dec. 27, 2004

(51) Int. Cl.
*H01M 8/10* (2006.01)
(52) U.S. Cl. .......................... 429/13; 429/23
(58) Field of Classification Search ............... 429/13, 429/22, 23
See application file for complete search history.

(56) References Cited

U.S. PATENT DOCUMENTS

| | | | |
|---|---|---|---|
| 5,945,229 A * | 8/1999 | Meltser | 429/23 X |
| 6,299,996 B1 | 10/2001 | White et al. | |
| 6,316,135 B1 | 11/2001 | Breault et al. | |
| 6,358,639 B2 | 3/2002 | Oko et al. | |
| 7,038,424 B2 * | 5/2006 | Adams et al. | 429/22 X |
| 2003/0134164 A1 | 7/2003 | Reiser et al. | |
| 2003/0134165 A1 | 7/2003 | Reiser et al. | |
| 2003/0215693 A1 * | 11/2003 | Asai et al. | 429/38 |

FOREIGN PATENT DOCUMENTS

DE  101 34 193  * 2/2002

* cited by examiner

*Primary Examiner*—Stephen J. Kalafut
(74) *Attorney, Agent, or Firm*—Malcolm J. Chisholm, Jr.

(57) ABSTRACT

A decontamination procedure for a fuel cell power plant (10) includes operating the plant to produce electrical power for an operating period, and then terminating operation of the plant (10) for a decontamination period, and then, whenever optimal electrical production of a plant fuel cell (12) is reduced by at least 5% by contaminants adsorbed by fuel cell electrodes (24, 42), decontaminating the fuel cell (12) of the plant (10) during the decontamination period by oxidizing contaminants adsorbed by electrodes (24, 42) of the fuel cell. Oxidizing the contaminants may be accomplished by various steps including exposing the electrodes (24, 42) to flowing oxygen; to heated flowing oxygen; to a sequence of start-stop cycles; and, to varying controlled potentials.

10 Claims, 3 Drawing Sheets

DECONTAMINATION PROCEDURE FOR A FUEL CELL POWER PLANT

TECHNICAL FIELD

The present invention relates to fuel cell power plants that are suited for usage in transportation vehicles, portable power plants, or as stationary power plants, and the invention especially relates to a decontamination procedure for a fuel cell power plant that provides for implementing decontamination periods between operating periods of the plant to remove contaminants from fuel cell electrodes of the power plant.

BACKGROUND ART

Fuel cell power plants are well known and are commonly used to produce electrical power from hydrogen containing reducing fluid fuel and oxygen containing oxidant reactant streams to power electrical apparatus such as generators and transportation vehicles. In fuel cell power plants of the prior art, it is known that contaminants may be adsorbed by electrodes of the fuel cells of the plant thereby degrading performance of the power plant. In particular, it is known that hydrogen sulfide is common in various hydrogen fuels and upon passing through a fuel cell becomes an anode catalyst poison. Even very small concentrations of hydrogen sulfide will cause severe fuel cell performance loss over time. Other known contaminants include ammonia, and organic compounds of "direct antifreeze solutions" such as compounds disclosed in commonly owned U.S. Pat. No. 6,316,135, that also become adsorbed by fuel cell electrodes.

Known methods of removing contaminants from fuel cells include passing a liquid removal substance such as an organic solvent, a peroxide or ozonated water through the fuel cell when the fuel cell is not operating, as disclosed in U.S. Pat. No. 6,358,639 that issued on Mar. 19, 2002 to Oko et al. Such a method however, necessarily involves use of complex and costly liquid pumping and valve systems and a significant interruption of operation of the fuel cell. U.S. Pat. No. 6,299,996 that issued on Oct. 9, 2001 discloses use of a system having three valves for switching fuel cells of the system from a first operational state wherein fuel passes through anode flow field plates to a second operational state wherein an oxidant gas supply flows through the anode flow field plates. This system also requires several complicated valves with multiple positions and elaborate flow paths.

Accordingly, there is a need for a decontamination procedure that can efficiently remove contaminants from fuel cell electrodes without requiring extensive interruption of operation of the fuel cell power plant and that does not require costly, complex valve and flow path apparatus.

DISCLOSURE OF INVENTION

The invention is a decontamination procedure for a fuel cell power plant, wherein the plant includes at least one fuel cell for generating electrical power from hydrogen containing reducing fluid fuel and oxygen containing oxidant reactant streams. A power circuit is connected to the fuel cell for directing the electrical power from the fuel cell to a primary electrical load. The fuel cell includes an anode electrode and a cathode electrode on opposed sides of an electrolyte, an anode flow field in fluid communication with the anode electrode for directing the hydrogen fuel to flow through the fuel cell and adjacent the anode electrode, and a cathode flow field in fluid communication with the cathode electrode for directing the oxidant stream to flow through the fuel cell and adjacent the cathode electrode.

The decontamination procedure includes the steps of operating the fuel cell power plant to produce electrical power for an operating period by connecting the primary electrical load to the fuel cell, directing a flow of the oxidant through the cathode flow field, and directing a flow of the hydrogen fuel through the anode flow field. Whenever electrical power production of the fuel cell is reduced by at least 5% by contamination of the electrodes, the operating period is terminated and a decontamination period is initiated by disconnecting the electrical load from the fuel cell. Next, the fuel cell is decontaminated during the decontamination period by oxidizing contaminants adsorbed on the electrodes during the operating period. The decontamination period is then terminated by re-connecting the primary electrical load to the fuel cell to operate the plant. The decontamination period may be adjusted as part of a specific maintenance schedule for the fuel cell power plant based on contaminants in the fuel, etc.

In a preferred method of operation, the decontamination procedure includes the further step of oxidizing the contaminants by opening the anode flow field and the cathode flow field to an oxygen containing oxidant during the decontamination period, such as stagnant, ambient air. Opening the anode and cathode flow field to the oxygen containing oxidant is preferably performed by transitioning flow from a hydrogen containing fluid to an oxidant containing fluid using a procedure disclosed in co-owned U.S. patent application Ser. No. 10/305,300, now U.S. Pat. No. 6,858,336, that was published on Jul. 17, 2003 under Pub. No. US 2003/0134164 A1, wherein a fast purge of an anode flow field with air upon shut down of a fuel cell is described. An additional preferred method includes the further step of oxidizing the contaminants by directing a flow of oxidant through the anode flow field and the cathode flow field of the fuel cell. An additional preferred method includes oxidizing the contaminants by heating the oxidant prior to directing a flow of the heated oxidant through the anode flow field and the cathode flow field of the fuel cell. The flow of the oxidant may be directed through the anode flow field by known methods of providing a flow, such as by an oxidant blower a compressor, or by a supply of pressurized oxidant, etc.

The heated oxidant may be heated by a known heater in fluid communication with an oxidant inlet of the fuel cell. In addition, the flow of the oxidant or heated oxidant through the anode flow field may be facilitated by directing flow of the oxidant leaving the fuel cell through a fuel cell exhaust recycle loop and back through the anode and cathode flow fields to achieve a more rapid and more efficient decontamination of the fuel cell electrodes. The fuel cell itself may be heated by any other convenient method known in the art that will improve the decontamination procedure. Such methods include using a heated coolant flowing adjacent to the fuel cell, or performing the decontamination procedure while the fuel cell is at or about normal operating temperature.

An additional alternative method of the decontamination procedure includes the further steps of oxidizing the contaminants by performing at least two and no more than ten cycles by alternating flow through the anode flow field between a hydrogen containing fluid and an oxygen containing fluid preferably in a manner disclosed in the aforesaid U.S. patent application Ser. No. 10/305,300 for shutting down a fuel cell, and for starting up a fuel cell in a manner disclosed in U.S. patent application Ser. No. 10/305,301, now U.S. Pat. No. 6,887,599, that was published on Jul. 17, 2003 under Pub. No. US 2003/0134165 A1, and which discloses a fast purge of air within an anode flow field by a hydrogen containing fluid followed thereafter by connecting a primary electrical load to start up the fuel cell.

The decontamination procedure may also include oxidizing the contaminants by directing flow of the hydrogen fuel through the anode flow field, connecting a source of direct current voltage to the anode and cathode electrodes, and applying the direct current voltage to increase a potential of the cathode electrode relative to the anode electrode by more than about 0.9 volts and by less than about 1.6 volts. Additionally, application of the direct current voltage to the anode and cathode electrodes may be cycled on and off between 5 and 20 times. This procedure may also be performed with an alternating current power source of an appropriate voltage, frequency and current.

A further alternative of the decontamination procedure includes oxidizing the contaminants by opening the anode flow field and the cathode flow field to an oxygen containing oxidant, again in accordance with the procedures for shutting down a fuel cell disclosed in the aforesaid U.S. patent application Ser. No. 10/305,300. Then a positive terminal of a source of direct current voltage is connected to one of the electrodes and a negative terminal of the source of direct current voltage is connected to the other electrode. The direct current voltage applied to the electrodes is controlled so that a voltage of the fuel cell is between about 0.0 volts and about 0.5 volts, and so that a potential of the anode electrode is above an anode air potential, and so that a potential of the cathode electrode is below a cathode air potential. Additionally, the positive and negative terminals of the direct current voltage source can be alternately reversed such that the positive terminal is connected to the opposite electrode and the negative terminal is connected to the opposite electrode. This reversal may occur between 5 and 20 times in a preferred method.

The decontamination procedure also includes implementation of the above-described steps on a first fuel cell of power plant while a second fuel cell continues ordinary operation. For example, it is known that for a large generator, fuel cells may be arranged in two or more fuel cell stack assemblies wherein each fuel cell stack assembly utilizes common manifolding and flow structures for directing flow of reactant streams and of electrical power, as is well known. The present invention includes implementing the described decontamination procedure on a first fuel cell or first fuel cell stack assembly that is not in an operating period connected to the primary electrical load, while a second fuel cell or second fuel cell stack assembly is in an operating period and connected to the primary electrical load. The second fuel cell or fuel cell stack assembly may thereby provide any electrical power necessary for implementing the described decontamination procedure on the first fuel cell or first fuel cell stack assembly, to enhance efficiencies of the decontamination procedure.

The decontamination procedure for a fuel cell power plant of the present invention may be implemented through a custom-designed maintenance schedule having a specific duration of the operation period for each decontamination period. Such a maintenance schedule for a given power plant can be custom-designed to meet anticipated needs of that particular power plant based upon the configuration of the power plant, operating parameters of the plant and the specific fuel the plant is to use. The custom-designed maintenance schedule could be set by a control scheme designed to initiate a decontamination period when the power loss reaches a pre-determined level, such as about a 20% reduction. Such a custom-designed maintenance schedule enables the present decontamination procedure to eliminate virtually all contaminants from the fuel cell electrodes of the plant, resulting in no significant performance decay of the plant for a very protracted operation.

Accordingly, it is a general purpose of the present invention to provide a decontamination procedure that overcomes deficiencies of the prior art.

It is a more specific purpose to provide a decontamination procedure for a fuel cell power plant that may be utilized within a maintenance schedule to eliminate contaminants of fuel cell electrodes of the plant without need for complex, costly valves and elaborate flow paths.

These and other purposes and advantages of the present decontamination procedure for a fuel cell power plant will become more readily apparent when the following description is read in conjunction with the accompanying drawings.

DESCRIPTION OF THE PREFERRED EMBODIMENTS

Figure 1:
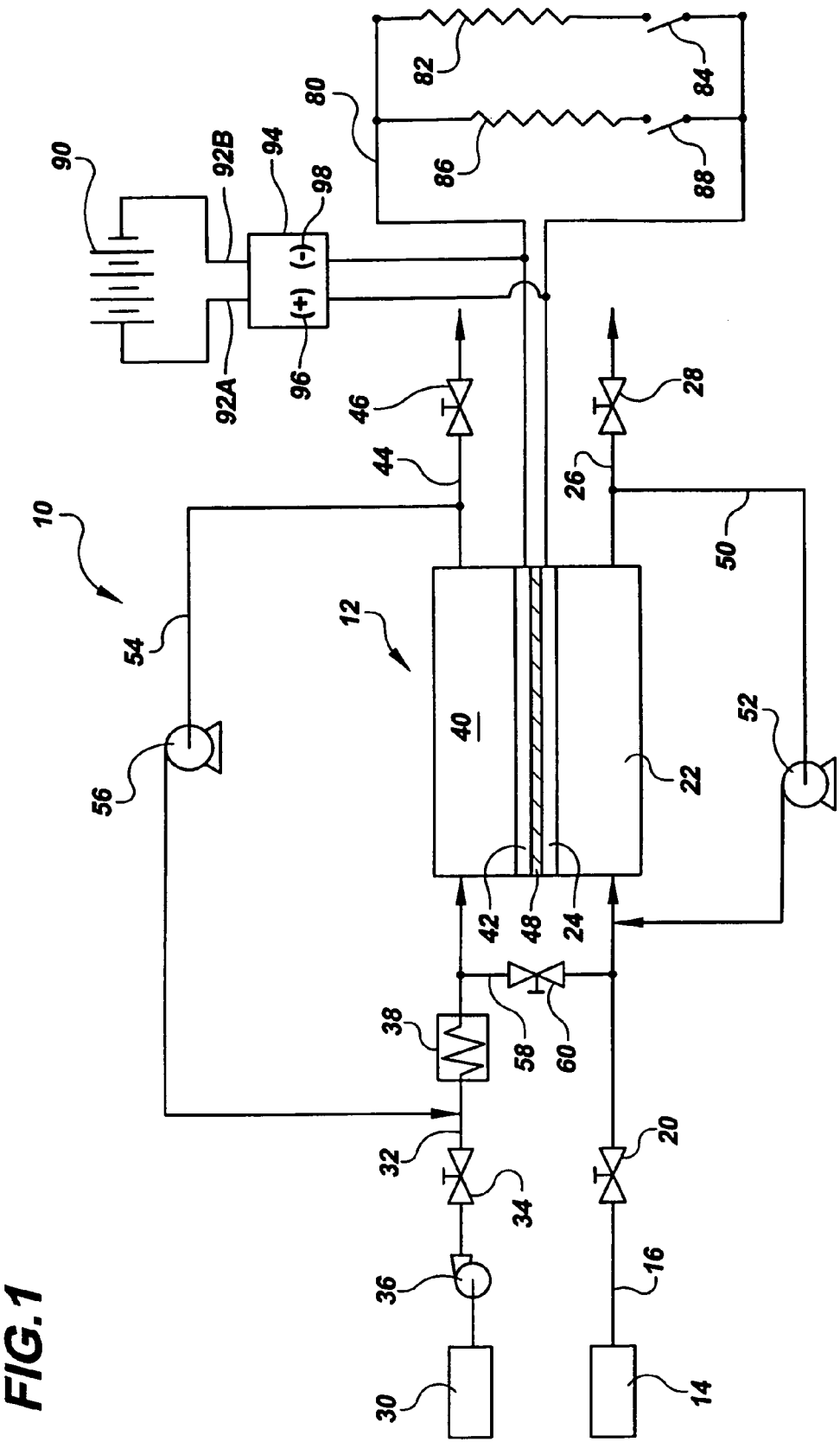
FIG. 1 is a simplified schematic representation of a fuel cell power plant appropriate for implementing the decontamination procedure for a fuel cell power plant of the present invention.

Referring to the drawings in detail, a fuel cell power plant appropriate for implementation of the present decontamination procedure for a fuel cell power plant is shown in FIG. 1, and is generally designated by the reference numeral 10. The plant 10 includes at least one fuel cell 12 for generating electrical power from hydrogen containing reducing fluid fuel and oxygen containing oxidant reactant streams. The hydrogen fuel is directed from a fuel storage source 14 through a fuel inlet 16 that includes a fuel inlet valve 20. The fuel then passes through an anode flow field 22 of the fuel cell 12 that directs the fuel to pass adjacent an anode electrode 24 of the fuel cell 12 in a manner well known in the art. The fuel then passes out of the fuel cell through a fuel outlet 26 having a fuel outlet valve 28.

Similarly, the oxidant is directed from an oxidant source 30, such as atmospheric air, through an oxidant inlet 32 that includes an oxidant inlet valve 34 and that may also include an oxidant blower or compressor 36 for increasing the flow rate and pressure of the oxidant, and an oxidant heater 38. The oxidant inlet 32 directs the oxidant into the fuel cell 12 where it passes through a cathode flow field 40 that directs the oxidant to pass adjacent a cathode electrode 42. An oxidant outlet 44 directs the oxidant out of the cathode flow field 40 through an oxidant outlet valve 46. An electrolyte 48, such as a solid proton exchange membrane known in the art, is secured between the anode electrode 24 and cathode electrode 42 within the fuel cell 12.

The power plant 10 may also include a fuel cell exhaust recycle loop means for directing flow of the fuel cell reactants exiting the fuel cell 12 back into the fuel cell 12. The fuel cell exhaust recycle loop means may include a fuel recycle loop 50 secured in fluid communication between the fuel outlet 26 and the fuel inlet 16 downstream of the fuel inlet valve 20 with a fuel recycle blower 52 secured to the fuel recycle loop 50.

The exhaust recycle loop means may also have an oxidant recycle loop 54 secured in fluid communication between the oxidant outlet 44 and the oxidant inlet 32 downstream from the oxidant inlet valve 34, and having an oxidant recycle blower 56 secured to the oxidant recycle loop 54. An oxidant cross-over means may also be secured between the oxidant inlet 32 and the fuel inlet 16 for selectively directing flow of the oxidant from the oxidant inlet 32 into the fuel inlet 16. The oxidant cross-over means may include any apparatus known in the art capable of that function, such as an oxidant cross-over line 58 and oxidant cross-over valve 60 secured in fluid communication between the fuel inlet 16 and oxidant inlet 32 downstream from the fuel inlet valve 20 and the oxidant inlet valve 34.

A power circuit 80 is secured in electrical communication with the fuel cell 12 and with a primary electrical load 82 and primary electrical load switch 84. The power circuit also includes an auxiliary load 86, such as a resistive load that may be actuated by closing an auxiliary load switch 88. Additionally, a source of direct current voltage 90 is secured through direct current lines 92A, 92B, to a direct current controller 94. The direct current controller 94 may be used to simply connect and disconnect and selectively control application of the direct current from the direct current voltage source 90 to the anode electrode 24 and cathode electrode 42, such as through the power circuit 80. Additionally, the direct current controller may be utilized to specifically direct a positive direct current terminal 96 be connected through the line 92A to the anode electrode 24, and the negative direct current terminal 98 be connected to through line 92B to the cathode electrode 42, such as through the power circuit 80 as shown in FIG. 1, or as otherwise known in the art.

The direct current controller 94 may also be any controller means known in the art that is capable of performing the described functions, and that may also be capable of selectively interrupting application of the direct current to the anode electrode 24 and cathode electrode 42 for a sequence of interrupted applications of the direct current through a decontamination period; that may also be used to measure potentials of the anode electrode 24 and cathode electrode 42; and, that may also control application of or terminate application of current to the electrodes 24, 42 in response to measured potentials of the electrodes 24, 42. The source of direct current voltage 90 may be any apparatus known in the art capable of supplying a direct current voltage, such as a battery, or an inverter in electrical communication with an exterior source of alternating current, such as the grid, or an inverter in electrical communication with the power circuit 80, etc. The power source to the fuel cell may also include an alternating current power device if conditions warrant such a device.

The described fuel cell power plant 10 may be utilized to implement the decontamination procedure of the present invention by the plant 10 first operating to produce electrical power for an operating period (the phrase "operating period" meaning herein for a specific duration). Next, whenever optimal electrical power production of the fuel cell is reduced by at least 5% by contamination of the anode electrode 24 and/or the cathode electrode 42, the operating period is terminated and a decontamination period is initiated by opening the primary load switch 84 to disconnect the primary load 82 from the fuel cell 12. In a first preferred method of decontaminating the fuel cell 12, the flow of hydrogen containing fuel is terminated by closing the fuel inlet valve 20, and air is permitted to flow into the anode flow field 22, such as by opening the cross-over valve 60, or by any method known in the art. To minimize damage to the fuel cell 12, movement of air into the anode flow field 22 would preferably follow the shut down method disclosed in the aforesaid U.S. patent application Ser. No. 10/305,301. By having air on both the anode electrode 24 and the cathode electrode 42, both electrodes are decontaminated at the same time. In such an air/air mode, both electrodes 24, 42 can rise to an electrode potential (compared to a standard reference hydrogen electrode) above the normal fuel cell 12 open circuit potential because no hydrogen fuel is present to suppress the cathode electrode 42 potential. In such an air/air mode, both electrodes 24, 42 can rise to a potential of between about 1.0 and about 1.25 volts. The decontamination of the electrodes 24, 42 by this method may be enhanced by cycling the potential of the electrodes 24, 42 in the 1.0 to 1.25 volt range by the additional step of alternating the flow through the anode flow field 22 between the above described oxygen containing oxidant and the hydrogen fuel by closing the cross-over valve 60 and opening the fuel inlet valve 30, or through any manner known in the art that accomplishes alternating flow through the anode flow field 22 between oxidant and hydrogen reactant streams until the fuel cell 12 is returned to optimal electrical power production. In an additional method, the alternating flow may be cycled for at least two and no more than ten cycles for purposes of efficiency. By this step, the upper voltage limit is the theoretical open circuit voltage with the hydrogen fuel on the anode electrode 24 and the oxygen containing oxidant on the cathode electrode 42.

In a second preferred method of decontaminating the fuel cell 12, upon shut down by disconnecting the primary electrical load 82, the fuel inlet valve 60 remains open so hydrogen remains on the anode electrode 24 and air remains on the cathode electrode 42. Next, the direct current voltage source 90 is controlled by the controller 94 so that the cathode electrode 42 achieves a voltage of between about 0.9 volts and about 1.6 volts compared to a standard hydrogen electrode. This method is less complex than the previous method because the cross-over valve 60 is not utilized and the electrodes 24, 42 remain on their normal hydrogen and oxygen reactants during the procedure. However, this decontamination method is limited to only decontaminating the cathode electrode 42. The direct current voltage controller 94 sets the voltage limit for the electrodes 24, 42. Additionally, application of the direct current voltage to the anode and cathode electrodes may be cycled on and off between 5 and 20 times.

In a third preferred method of decontaminating the fuel cell 12, like the first preferred method, upon shut down by disconnecting the primary electrical load 82, the flow of hydrogen containing fuel is terminated by closing the fuel inlet valve 20, and air is permitted to flow into the anode flow field 22, such as by opening the cross-over valve 60, or by any method known in the art. To minimize damage to the fuel cell 12, movement of air into the anode flow field 22 would preferably follow the shut down method disclosed in the aforesaid U.S. patent application Ser. No. 10/305,301. The direct current voltage source 90 is then controlled by the controller 94 to drive the fuel cell 12 electrodes 24, 42 so that each electrode is alternately raised and lowered between a potential of about 1.0 and a potential of about 1.6 volts relative to a standard reference hydrogen electrode, such as by reversing the current through the controller 94 between the controller terminals 96 and 98. While the anode electrode 24 and cathode electrode 42 are alternating by the controller 94 between the described voltage range, oxygen containing oxidant such as air is directed to a minimal flow through both the anode flow field 22 and the cathode flow field 40. The flow of air is not more than that required to sustain a current of between about 10 and about 50 milliamps per square centimeter. Simultaneously, a voltage differential between the anode electrode 24 and the cathode electrode 42 is controlled by the controller 94 so that the voltage differential is limited to about 0.5 volts. When a 0.5 volts differential is reached, the controller 94 reverses direction of the direct current flow to the anode and cathode electrodes 24, 42.

In all the described methods of decontamination, special care must be taken to ensure that the decontamination methods do not cause irreparable damage to either electrode. Damage can be avoided by using the fuel cell 12 start up and shut down procedures described in the aforesaid, U.S. patent application Ser. Nos. 10/305,300 and 10/305,301. Both of those patent applications are owned by the assignee of all rights in the present invention. The duration of the decontamination period using any of the described methods is adequate to return the fuel cell 12 to optimal electrical power output. Additionally, for purposes herein, the word "about" is to mean plus or minus ten percent.

The above described decontamination procedure including the described methods of decontaminating by oxidizing the contaminants of the electrodes 24, 42, may also be implemented upon a first fuel cell 12 while the first fuel cell 12 is in a decontamination period, and a second fuel cell (not shown) is in an operating period. That would provide enhanced efficiencies by providing electrical power for any of the decontaminating methods that require a source of electrical power. It is well known that demand for electrical power is irregular, wherein a fuel cell power plant having a plurality of fuel cells operates at a peak capacity with all fuel cells operating, and the plant also operates to supply a lower demand, wherein some of the fuel cells may not be operating. For purposes of efficiency herein, it is to be understood that describing a fuel cell power plant having a plurality of fuel cells may have those fuel cells arranged in two or more fuel cell stack assemblies that are well known in the art. Moreover, if such a fuel cell power plant having a plurality of fuel cell stack assemblies (not shown) implemented any of the decontamination procedures and methods described herein, the methods would most likely be performed on a first fuel cell stack assembly that was not generating electricity, while another or second fuel cell stack assembly would be operating to provide any needed electricity for the decontamination procedure and any electricity needed by the plant. Subsequently, the second or operating fuel cell stack assembly would be controlled to go into a decontamination period, while the first fuel cell stack assembly would be operating and providing any electricity need by the plant and the second fuel cell stack assembly undergoing the decontamination procedure. In this manner, a fuel cell power plant serving as a generator could implement a regular decontamination procedure without any interruption of its ordinary operating requirements. For purposes herein, such an arrangement will simply be characterized as the fuel cell power plant 10 having a first fuel cell 12 and a second fuel cell (not shown), wherein the first fuel cell 12 is in a decontamination period while the second fuel cell is in an operating period.

Figure 2:
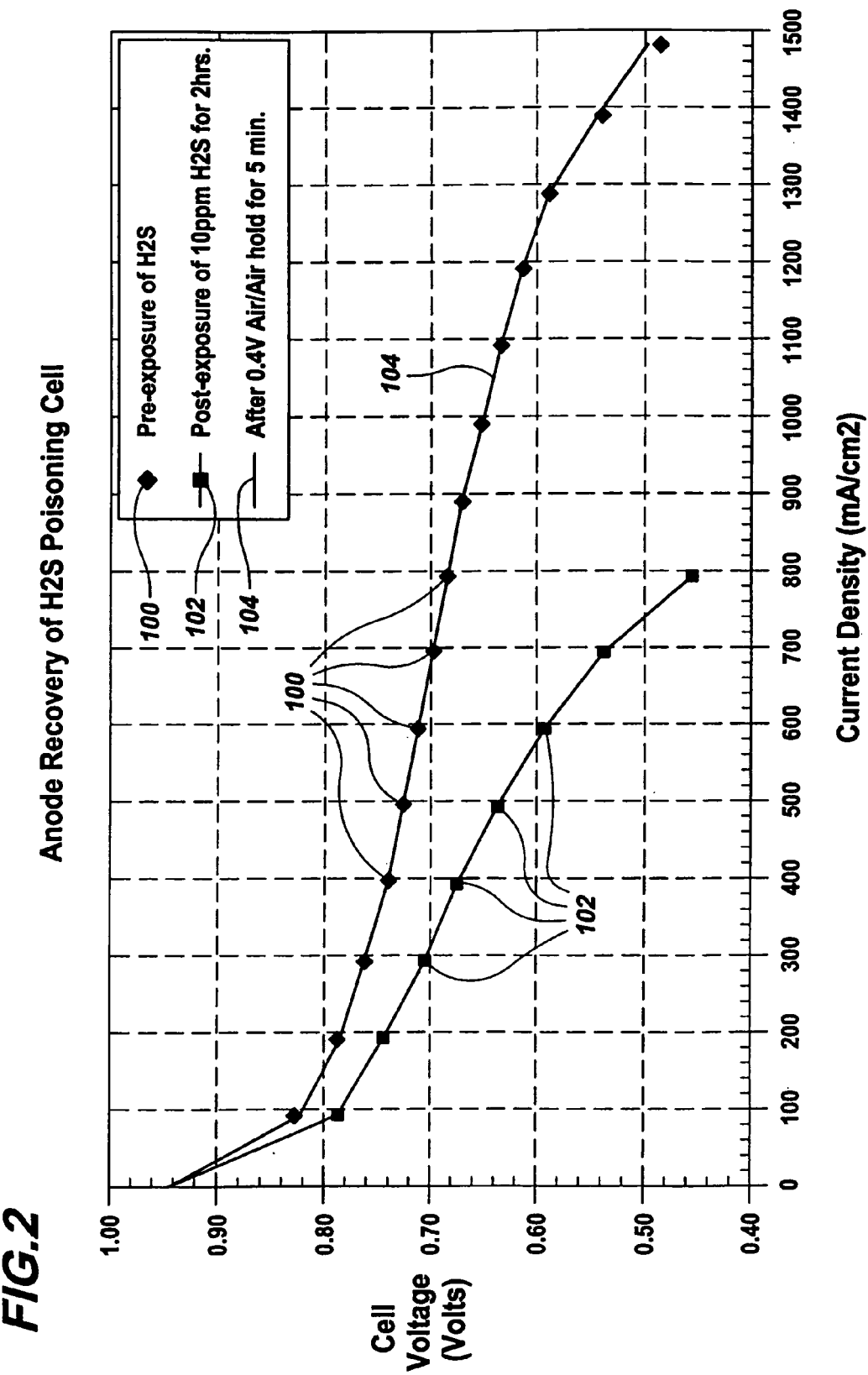
FIG. 2 is a graph showing a plot of cell voltages and current densities for a fuel cell prior to exposure to a hydrogen sulfide contaminant, after exposure to the hydrogen sulfide contaminant, and after implementation a preferred method of the decontamination procedure of the present invention.

FIG. 2 shows a test demonstrating a complete recovery of a fuel cell to pre-contamination operating performance after only five minutes of application of one of the oxidizing methods of the above described decontamination procedures. A test fuel cell operating with an oxidant temperature at exit from the fuel cell of about 65 degrees centigrade (hereafter "° C."), with a coolant flow of 340 cubic centimeters per minute ("ccm") and with hydrogen gas and atmospheric air as the reactant streams produced a plot of cell voltages at varying current densities as indicated by the diamond-shaped data plots at reference numeral 100 of FIG. 2. After exposure to hydrogen sulfide at a concentration of 10 parts per million within the anode reactant stream for two hours, the performance of the fuel cell degraded significantly producing a plot of cell voltages at varying current densities as indicated by the square-shaped plots at reference numeral 102. Next, the decontamination procedure of the present invention was applied to the test fuel cell, wherein the oxidizing the electrode contaminants step included connecting a positive terminal of a direct current source to the anode electrode, and connecting a negative terminal of the direct current source to the cathode electrode of the fuel cell with an oxidant on both electrodes. The direct current was applied to the cell so that the voltage of the fuel cell was held at about 0.4 volts for about five minutes. After implementation of those steps of the decontamination procedure of the present invention, measurement of the cell voltages at varying current densities produced plots as seen by the line in FIG. 2 designated by reference numeral 104 that completely overlies the original plots of the fuel cell represented in FIG. 2 by reference numeral 100. This indicates complete recovery of the fuel cell in only five minutes by the aforesaid steps.

Figure 3:
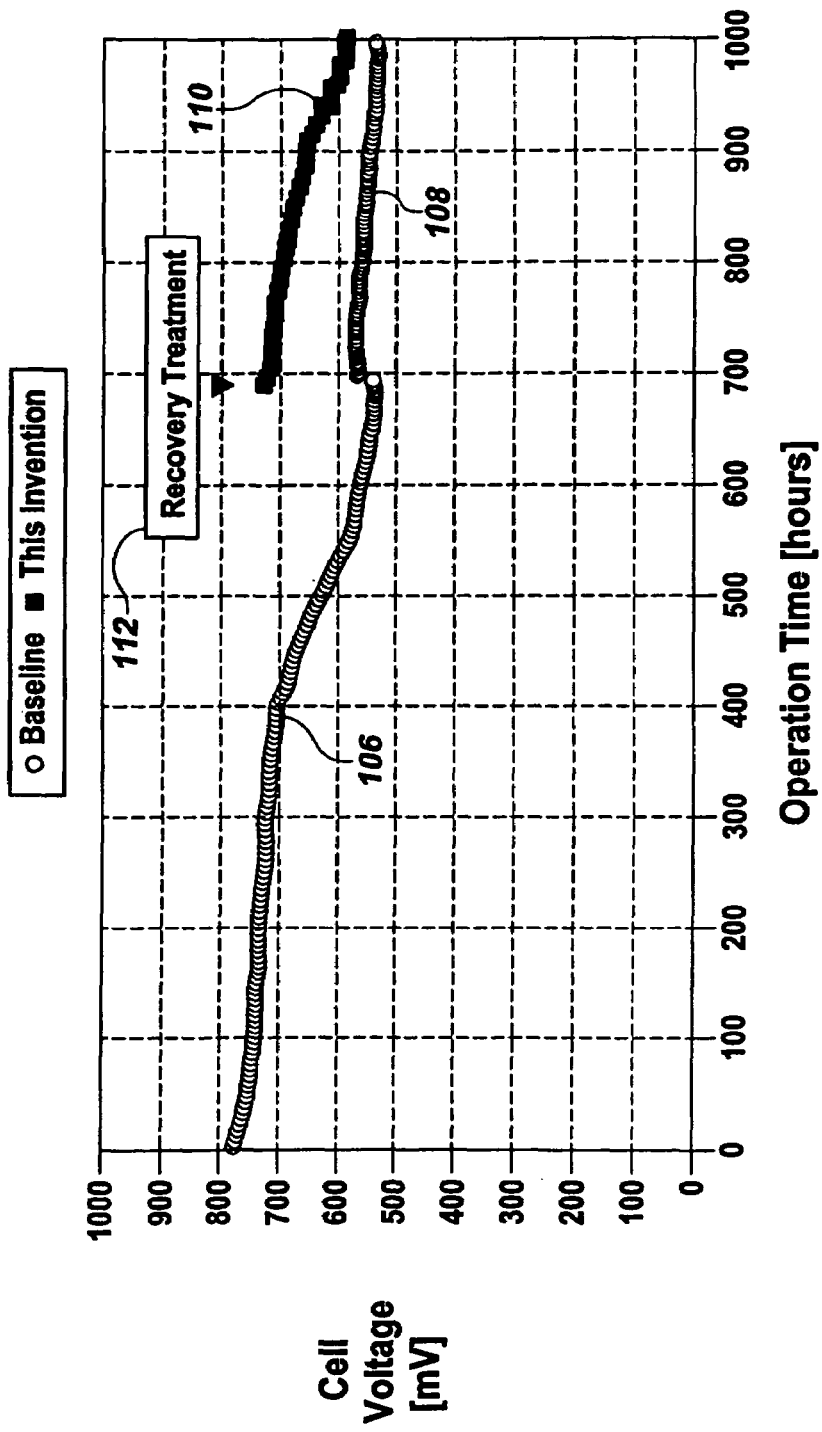
FIG. 3 is a graph showing a reduction in fuel cell performance due to contamination of a cathode electrode by sulfur dioxide, and a recovery of that performance reduction after implementation of the decontamination procedure of the present invention.

FIG. 3 shows results of an additional test demonstrating reduction in performance of a fuel cell due to contamination of a cathode electrode with sulfur dioxide. Plots at reference numeral 106 show decline in cell voltage after 700 hours of operation, and further plots at reference numeral 108 show a baseline of reduced performance. Plots at reference numeral 110 show improved fuel cell performance after a application of a decontamination procedure indicated by the phrase "Recovery Treatment" at reference numeral 112. The improved performance was achieved by the second preferred decontamination procedure described above wherein hydrogen remains on the anode electrode 24 and air remains on the cathode electrode 24.

As is apparent, the decontamination procedure of the present invention readily provides for a custom-designed maintenance schedule having a specific duration of an operating period for each decontamination period based upon the operating requirements of a particular fuel cell power plant and the nature of specific reactant streams. For fuel cell power plants used to power transportation vehicles, a custom-designed maintenance schedule could be integrated with likely shut-down intervals when the transportation vehicle, such as a bus, is not being used. For example, if a fuel cell power plant powered bus was to have an operating period for eighteen hours of each day, the maintenance period could be controlled to be implemented after each operating period, or after a particular number of operating periods, such as once every thirty operating periods, depending upon decontamination requirements. Additionally, for fuel cell power plants utilized as power generators, a custom-designed maintenance schedule may be utilized wherein one fuel cell or fuel cell stack assembly is undergoing a decontamination period while another fuel cell or cell stack assembly of the plant is within an operating period.

The patents and patent applications referred to above are hereby incorporated herein by reference.

While the present invention has been disclosed with respect to the described and illustrated decontamination procedure and methods, it is to be understood that the invention is not to be limited to those embodiments. For example, while the fuel cell power plant 10 is shown with a cross-over line 58 and valve 60, and with the oxidant and fuel recycle loops 54, 50, it is to be understood that many of the described methods of oxidizing the electrode contaminants can be accomplished without those components, such as by simply opening the oxidant inlet valve 34, oxidant outlet valve 46 and fuel outlet valve 28 while the fuel inlet valve 20 is closed to simply permit opening of the flow fields 22, 40 to ambient air. Accordingly, reference should be made primarily to the following claims rather than the foregoing description to determine the scope of the invention.

What is claimed is:

1. A decontamination procedure for a fuel cell power plant (10), wherein the plant (10) includes at least one fuel cell (12) for generating electrical power from hydrogen containing reducing fluid fuel and oxygen containing oxidant reactant streams, a power circuit (80) for directing the electrical power from the fuel cell (12) to a primary electrical load (82), the fuel cell (12) including an anode electrode (24) and a cathode electrode (42) on opposed sides of an electrolyte (48), an anode flow field (22) in fluid communication with the anode electrode (24) for directing the hydrogen fuel to flow through the fuel cell (12) and adjacent the anode electrode (24), and a cathode flow field (40) in fluid communication with the cathode electrode (42) for directing the oxidant stream to flow through the fuel cell (12) and adjacent the cathode electrode (42), the decontamination procedure comprising the steps of:
   a. operating the fuel cell power plant (10) to produce electrical power for an operating period by connecting the primary electrical load (82) to the fuel cell (12), directing a flow of the oxidant through the cathode flow (40) field, and directing a flow of the hydrogen fuel through the anode flow field (22);
   b. then, whenever electrical power production of the fuel cell (12) is reduced by at least 5% by contamination of the anode electrode (24) and/or the cathode electrode (42), terminating operation of the fuel cell (12) of the plant (10) for a decontamination period by disconnecting the electrical load (82) from the fuel cell (12);
   c. then, decontaminating the fuel cell (12) during the decontamination period by terminating flow of the hydrogen fuel through the anode flow field (22) and then directing a flow of an oxygen containing oxidant stream through the anode flow field (22) so that a potential of the electrodes (24, 42) rises to between about 1.0 and 1.25 volts, compared to a standard hydrogen reference electrode, to oxidize contaminants adsorbed on at least one of the anode electrode (24) and cathode electrode (42) during the operating period.

2. The decontamination procedure of claim 1, comprising the further step of, during the decontaminating the fuel cell (12) step and after the step of directing a flow of an oxidant containing oxidant stream through the anode flow field (22), cycling the potential of the electrodes (24, 42) by alternating the flow through the anode flow field (22) between the oxygen containing oxidant stream and the hydrogen containing fuel stream until the fuel cell (12) is returned to optimal electrical power production.

3. The decontamination procedure of claim 1, comprising the further step of cycling flow through the anode flow field (22) between the oxidant and hydrogen reactant streams at least two cycles.

4. The decontamination procedure of claim 1, comprising the further step of, during the decontaminating the fuel cell (12) step, heating the oxygen containing oxidant prior to directing the flow of the heated oxygen containing oxidant through the anode flow field (22) and the cathode flow field (40) of the fuel cell (12).

5. The decontamination procedure of claim 1, comprising the further step of, during the decontaminating the fuel cell (12) step, heating the fuel cell (12) while directing the flow of the oxygen containing oxidant through the anode flow field (22) and the cathode flow field (40) of the fuel cell (12).

6. A decontamination procedure for a fuel cell power plant (10), wherein the plant (10) includes at least one fuel cell (12) for generating electrical power from hydrogen containing reducing fluid fuel and oxygen containing oxidant reactant streams, a power circuit (80) for directing the electrical power from the fuel cell (12) to a primary electrical load (82), the fuel cell (12) including an anode electrode (24) and a cathode electrode (42) on opposed sides of an electrolyte (48), an anode flow field (22) in fluid communication with the anode electrode (24) for directing the hydrogen fuel to flow through the fuel cell (12) and adjacent the anode electrode (24), and a cathode flow field (40) in fluid communication with the cathode electrode (42) for directing the oxidant stream to flow through the fuel cell (12) and adjacent the cathode electrode (42), the decontamination procedure comprising the steps of:
   a. operating the fuel cell power plant (10) to produce electrical power for an operating period by connecting the primary electrical load (82) to the fuel cell (12), directing a flow of the oxidant through the cathode flow (40) field, and directing a flow of the hydrogen fuel through the anode flow field (22);
   b. then, whenever electrical power production of the fuel cell (12) is reduced by at least 5% by contamination of the cathode electrode (42), terminating operation of the fuel cell (12) of the plant (10) for a decontamination period by disconnecting the electrical load (82) from the fuel cell (12);
   c. then, decontaminating the fuel cell (12) during the decontamination period by connecting a source of direct current voltage (90) to the anode and cathode electrodes (24, 42), and applying the direct current voltage to increase a potential of the cathode electrode (42) relative to the anode electrode (24) to between about 0.9 volts and about 1.6 volts, compared to a standard hydrogen reference electrode, to oxidize contaminants adsorbed on the cathode electrode (42) during the operating period.

7. The decontamination procedure of claim 6, comprising the further step of, during the decontaminating the fuel cell (12) step, using a direct current controller (94) to cycle direct current voltage on and off between 5 and 20 times to vary a potential of the cathode electrode (42) relative to the anode electrode (24) to between about 0.9 volts and about 1.6 volts compared to a standard hydrogen reference electrode.

8. A decontamination procedure for a fuel cell power plant (10), wherein the plant (10) includes at least one fuel cell (12) for generating electrical power from hydrogen containing reducing fluid fuel and oxygen containing oxidant reactant streams, a power circuit (80) for directing the electrical power from the fuel cell (12) to a primary electrical load (82), the fuel cell (12) including an anode electrode (24) and a cathode electrode (42) on opposed sides of an electrolyte (48), an anode flow field (22) in fluid communication with the anode electrode (24) for directing the hydrogen fuel to flow through the fuel cell (12) and adjacent the anode electrode (24), and a cathode flow field (40) in fluid communication with the cathode electrode (42) for directing the oxidant stream to flow through the fuel cell (12) and adjacent the cathode electrode (42), the decontamination procedure comprising the steps of:
   a. operating the fuel cell power plant (10) to produce electrical power for an operating period by connecting the primary electrical load (82) to the fuel cell (12), directing a flow of the oxidant through the cathode flow (40) field, and directing a flow of the hydrogen fuel through the anode flow field (22);
   b. then, whenever electrical power production of the fuel cell (12) is reduced by at least 5% by contamination of the anode electrode (24) and/or the cathode electrode (42), terminating operation of the fuel cell (12) of the plant (10) for a decontamination period by disconnecting the electrical load (82) from the fuel cell (12);

c. then, decontaminating the fuel cell (12) during the decontamination period by terminating flow of the hydrogen fuel through the anode flow field (22) and then directing flow of an oxidant containing oxidant stream through the anode flow field (22);

d. then, connecting a source of direct current voltage (90) to the anode and cathode electrodes (24, 42), and controlling application of the direct current voltage to the electrodes (24, 42) so that a voltage differential between the electrodes is limited to about 0.5 volts, and whenever the voltage differential increases to about 0.5 volts, then controlling application of the direct current voltage to reverse a direction of current flow from the direct current source (90) to the anode and cathode electrodes (24) 42); and, e. while controlling application of the direct current voltage to the electrodes (24, 42), directing a minimal flow of an oxygen containing oxidant stream through the anode flow field (22) and cathode flow field (40).

9. The decontamination procedure of claim 8, comprising the further step of, during the decontaminating the fuel cell (12) step, heating the oxygen containing oxidant prior to directing the flow of the heated oxygen containing oxidant through the anode flow field (22) and the cathode flow field (40) of the fuel cell (12).

10. The decontamination procedure of claim 8, comprising the further step of, during the decontaminating the fuel cell (12) step, heating the fuel cell (12) while directing the flow of the oxygen containing oxidant through the anode flow field (22) and the cathode flow field (40) of the fuel cell (12).

* * * * *